United States Patent [19]
Lockitt et al.

[11] 3,761,809
[45] Sept. 25, 1973

[54] NOISE MODULATED ANALOGUE SIGNAL PRESENCE DETECTOR

[75] Inventors: John A. Lockitt, Hollisten, Mass.; Timothy S. Eller, Romulus, N.Y.

[73] Assignee: The United States of America as represented by the Secretary of the Navy, Washington, D.C.

[22] Filed: Apr. 27, 1970

[21] Appl. No.: 43,257

[52] U.S. Cl. ............ 324/77 R, 324/77 B, 328/140, 329/126, 340/1 R, 340/3 R
[51] Int. Cl. ............................................. G01r 23/16
[58] Field of Search .................. 324/77 R; 325/364; 328/140; 329/126; 340/3 R, 1 R

[56] References Cited
UNITED STATES PATENTS
3,317,828 5/1967 Schuls ................................ 340/1 R Primary Examiner—Benjamin A. Borchelt
Assistant Examiner—S. C. Buczinski
Attorney—R. S. Sciascia and Thomas O. Watson, Jr.

[57] ABSTRACT

A circuit for detecting presence of an analogue signal of unknown frequency in a noise environment. Detection is accomplished by determining and comparing the time variation between successive trailing edge zero crossings of the received signal. The components are a bandpass filter for passing only the frequency bandwidth within which the analogue signal is thought to be; an analogue to digital conversion means which produces a pulse everytime a trailing edge zero crossing occurs; an up-down counter, phase window detector, and frequency window detector which together determine and compare the time variation between successive trailing edge zero crossings and make a signal present or signal not present decision; and a post decision averaging means for averaging the signal present decisions received over a period of time, for providing greater protection against false detection.

8 Claims, 1 Drawing Figure

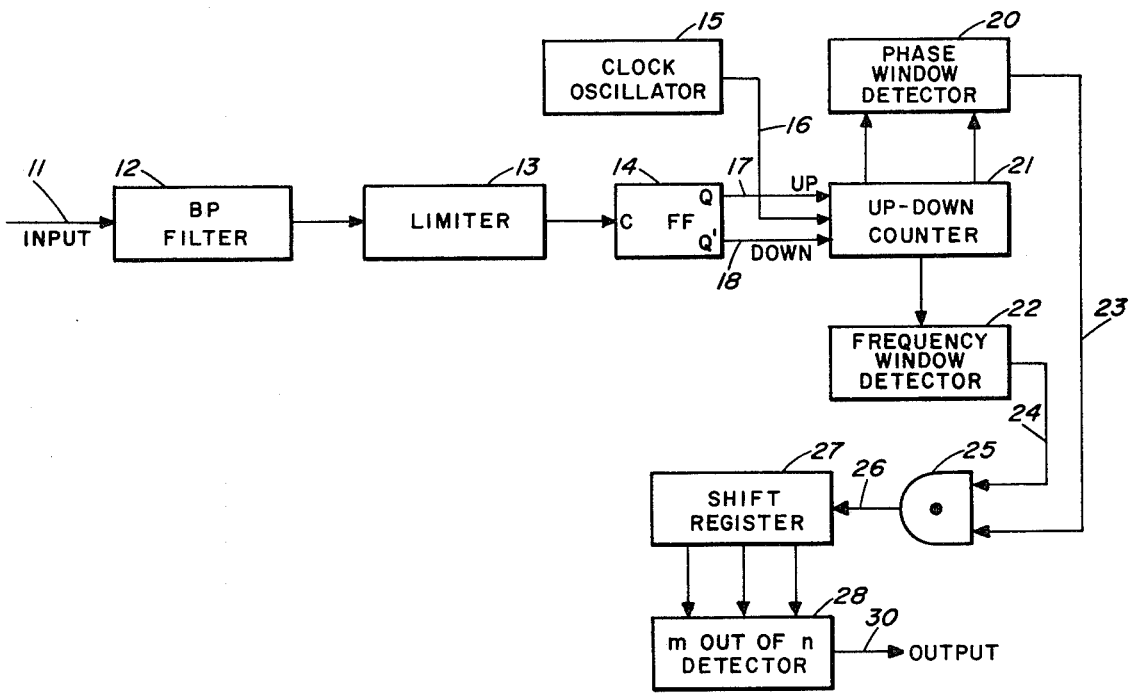
INVENTORS
JOHN A. LOCKITT
TIMOTHY S. ELLER
BY Thomas O. Watson Jr.
ATTORNEY

NOISE MODULATED ANALOGUE SIGNAL PRESENCE DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to signal presence detectors and more particularly pertains to detecting the presence, in a noise environment, of an analogue signal of unknown frequency within a specified bandwidth, which may be slowly varying in frequency due to doppler shift. Most signal presence detectors, envelope detect the energy in the signal bandwidth. This energy is then compared to either a standard level or the energy in a bandwidth of noise. This approach has the inherent disadvantage of relative low speed and high false detection probability, particularly when the bandwidth in which the signal may occur is wide. Other signal presence detectors that employ signal zero crossings as an indication of its presence are quite complex and inflexible.

SUMMARY OF THE INVENTION

The present invention utilizes a method of differentially coherent detection which is both simple and practically implemented, while allowing the detector to adapt to the frequency of the incoming signal within prescribed limits. The arrangement of this invention permits flexibility in the speed of detection and the degree of protection from false detection. The general purpose of this invention is to provide a signal presence detector that has all the advantages of similarly employed signal presence detectors and has none of the above described disadvantages. To obtain this, the present invention provides a unique combination of an up-down counter with a phase window detector and a frequency window detector to make a signal presence decision. To further enhance the reliability of the signal presence decision, a bandpass filter and a mechanism for post averaging of signal presence decisions is utilized.

OBJECTS OF THE INVENTION

An object of this invention is to provide improved detection of an analogue signal in a noise environment.

Another object is the provision of a simple and flexible digital system for differentially coherent detection of an analogue signal in a noise environment.

Yet a further object of this invention is to provide a digital system for differentially coherent detection of an analogue signal in a noise environment that permits flexibility in the speed of detection and degree of false detection protection.

Still another object is to provide detection of an analogue signal of unknown frequency in a noisy environment.

Other objects, advantages and novel features of the invention will become apparent from the following detailed description of the invention when considered in conjunction with the accompanying drawing.

BRIEF DESCRIPTION OF THE DRAWINGS

The FIGURE illustrates a preferred embodiment of the invention.

DESCRIPTION OF THE PREFERRED EMBODIMENT

Referring to the FIGURE. A noise modulated analogue signal, or an analogue signal in a noise background, is fed into the detector system of the FIGURE at input 11. Bandpass filter 12, which may take any form such as is well known in the art, restricts the bandwidth of the received signal to a frequency bandwidth somewhat larger than that in which the signal to be detected is expected to lie. A limiter 13, receives the filtered signal and limits the signal, in a manner well known in the art, so that a pulse is produced for every trailing edge zero crossing of the filtered signal. These pulses are fed to control flip flop 14, of the type well known in the art, having two stable states which are actuated in sequence by the pulses received at input C. The first pulse received at C causes a control pulse Q to be placed on line 17. The second pulse to be received causes the flip flop to change state and place a control pulse Q' on line 18.

A clock oscillator 15, which may take any form well known in the art, supplies clock pulses to up-down counter 21 which operates in a count up mode in response to a pulse on line 17 and in a count down mode in response to a pulse on line 18.

Upon a control pulse being placed on line 17 by control flip flop 14, up-down counter 21 is initiated and starts counting the pulses supplied to it by clock oscillator 15 over line 16 until flip flop 14 causes control pulse Q' to be placed on line 18. At this time, up-down counter 21 ceases counting up and proceeds to count down the pulses supplied to it by clock oscillator 15, until a control pulse again appears on line 17.

From the function of the invention as explained so far, it can be seen that a continuous wave signal free from all noise would produce a zero residual count in up-down counter 21, after the down count mode of counter 21. This is so because the up and down count periods of the counter are equal since a continuous wave signal with no additive noise has equal cycle periods and these cycle periods are what determine the time period between negative zero crossings of the signal. As noise is placed on the incoming signal and increases, the variation in the period between each zero crossing increases. The variation of the residual count, the count in the up-down counter after a completed cycle of the counter, increase proportionally. A large residual count corresponds to no signal presence, whereas a small residual count corresponds to a signal presence.

Resolution in the count is directly related to the frequency of clock oscillator 15.

Frequency window detector 22 determines whether or not the value of the count in up-down counter 21 at the end of the up mode is within the permissible range of counts for the expected range of incoming frequencies. If the count is within the permissible range preset within frequency window detector 22, a signal presence, indication is placed on line 24.

The phase window detector 20 has preset therein a count threshold which is compared to the residual count of up-down counter 21. If the residual count is below the count threshold, a signal presence decision, logic one, indication is placed on line 23 by detector 20. Thus, phase window detector 20 makes a signal present/signal not present decision, after every pair of negative zero crossings.

After this decision has been made, counter 21 is reset to zero and will start counting up upon reception of a pulse on line 17.

If the decision indications on lines 24 and 23 are both logic ones, which represent a signal presence indication, AND gate 25 will produce a logic one on output line 26, which represents a signal presence indication. The signal presence indications of line 26 are stored in shift register 27, which can take any form as is well known in the art to accomplish the function. Upon the plurality of signal presence indications in stored shift register 27 exceeding a predetermined number $m$ as sensed by $m$ out of $n$ detector 28, an output, which is the final useable indication of a signal presence, is placed on line 30 by detector 28.

Thus the system for the detection of analogue signals of unknown frequency when in a noise environment which is simple and flexible is provided. It should be understood of course that the foregoing disclosure relates to only a preferred embodiment of the invention and that numerous modifications or alterations may be made therein without departing from the spirit and scope of the invention as set forth in the appended claims.

What is claimed is:

1. A signal detector system comprising:
    means for generating a first control pulse at a first output in response to a first trailing edge zero crossing of a received signal, generating a second control pulse at a second output in response to a second trailing edge zero crossing of the received signal, and a third control pulse at said first output in response to a third trailing edge zero crossing of the received signal;
    clock pulse generating means;
    an up-down counter having a count up mode and a count down mode connected to said clock pulse generating means for counting said clock pulse and connected to said control pulse generating means, said counter being responsive to the first control pulse to initiate its count up mode, responsive to the second control pulse to terminate its count up mode and initiate its count down mode, and responsive to the third control pulse to terminate its count down mode, one complete cycle of the counter consisting of a count up mode and a count down mode;
    a phase window detector connected to said up-down counter, and responsive to said counter completing a cycle, to make a signal present or signal not-present decision, based on the residual count of said counter;
    a frequency window detector connected to said up-down counter, and responsive to said counter terminating its count up mode, to make a frequency decision on the incoming signal; and
    an AND gate connected to said phase window detector and said frequency window detector, and responsive to the decisions from both said detectors to produce a signal presence signal.

2. The detector system of claim 1 further comprising a bandpass filter connected to the input of said means.

3. The detector system of claim 1 further comprising:
    a shift register connected to the output of said AND gate for receiving and storing an $n$ number of signal presence signals from said AND gate; and
    an $m$ out of $n$ detector connected to said shift register, and responsive to an $m$ number of signal presence signals in said shift register, to produce a final signal present decision.

4. The detector system of claim 3 further comprising a bandpass filter connected to the input of said means.

5. The signal detector system of claim 1 wherein said means comprises:
    a limiter for producing a pulse for each trailing edge zero crossing of the signal at its input; and
    a control flip-flop having first and second outputs and an input connected to said limiter, being responsive to the pulses at its input to place a control pulse at the first output in response to a first pulse at its input and place a control pulse at its second output in response to a second pulse at its input.

6. The detector system of claim 5 further comprising:
    a shift register connected to the output of said AND gate for receiving and storing an $n$ number of signal presence signals from said AND gate; and
    an $m$ out of $n$ detector connected to said shift register and responsive to an $m$ number of signal presence signals in said register to produce a final signal present decision.

7. The detector system of claim 5 further comprising a bandpass filter connected to the input of said limiter for limiting the frequency bandwidth of the signal received.

8. The detector system of claim 7 further comprising:
    a shift register connected to the output of said AND gate for receiving and storing an $n$ number of signal presence signals from said AND gate; and
    an $m$ out of $n$ detector connected to said shift register and responsive to an $m$ number of signal presence signals in said register to produce a final signal present decision.

* * * * *